Figure 1:
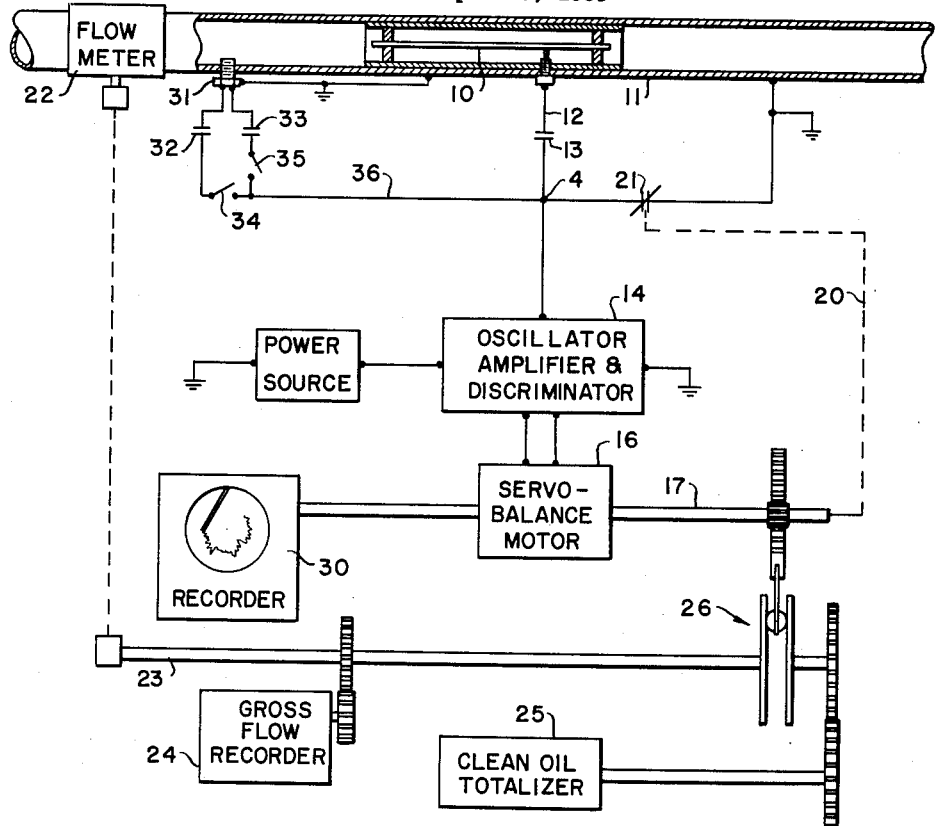

Dec. 4, 1962　　　W. J. WARREN　　　3,066,529
CRUDE OIL METERING AND RECORDING SYSTEM
Filed April 6, 1959

INVENTOR:
W. J. WARREN
BY: *Theodore E. Bieber*
HIS ATTORNEY

United States Patent Office 3,066,529
Patented Dec. 4, 1962

3,066,529
CRUDE OIL METERING AND RECORDING SYSTEM
William J. Warren, El Cerrito, Calif., assignor to Shell Oil Company, a corporation of Delaware
Filed Apr. 6, 1959, Ser. No. 804,512
2 Claims. (Cl. 73—194)

This invention relates to flow meters and more particularly to crude oil flow meters incorporating a capacitance cell for determining the composition of a crude oil flow and recording the quantity of clean oil flow.

Flow meters incorporating capacitance type cells are used for determining the quantity of B.S. and W. (i.e., bottom sediment and water) contained in the crude oil being transported in a crude oil pipeline or being produced from wells. It is necessary before any crude oil may be transferred from a production site to a crude oil pipeline or other transporting medium to accurately determine the quantity and nature of the product being transferred in order to comply with regulations set up by governmental and other regulatory bodies. In the past these operations have been conducted mainly by the taking of thief samples from the storage tanks at the wellhead or from the crude oil being transported in the pipeline and then analyzing it for the various constituents.

In recent years many of these transfer operations have been converted to automatic operation through the use of flow meters and capacitance type cells have been used in the flow meters for measuring the B.S. and W. content of the crude oil. The flow meters include metering means for recording both the total flow and clean oil flow through the pipeline or from the well. Suitable recording means are also provided for recording the percentage of water contained in the crude oil at each particular time. An automatic metering system similar to the above is described and claimed in the copending patent application of Warren, Wixson and Schneider entitled "Fluid Flow Recorder," Serial No. 593,403, filed June 25, 1956, now U.S. Patent 3,006,189. While the metering and recording system described in the Warren et al. application is suitable for determinning both the total flow and the total flow of clean oil it has one source of error. This source of inaccuracy or error arises from the fact that the dielectric constant of the crude oil water mixture changes with temperature. There is no provision in the Warren et al. device or other devices presently in use for compensating for changes in the dielectric constant of the crude caused by temperature changes in the crude oil water mixture. Thus the apparent reading obtained from the capacitance cell for the B.S. and W. content is in error and must be corrected manually.

Accordingly, it is the principal object of this invention to provide a temperature correcting means for a flow recording device of the type using a capacitance cell for determining the components of a two-phase fluid.

A further object of this invention is to provide a temperature compensating means which will correct for changes in the dielectric constant of both heavy and light oils for use with a flow recording system that incorporates a capacitance cell for measuring the B.S. and W content of the oil flow.

A further object of this invention is to provide a simple and compact temperature correcting means for fluid flow recorders incorporating capacitance type measuring cells which is adaptable for use with either light or heavy crude oils to correct for temperature changes.

This invention compensates for temperature changes in the crude oil water mixture being transported in a pipeline by use of a capacitor whose capacitance changes with temperature. More particularly the capacitor is divided into two sections, one section of which is provided with a negative temperature coefficient of capacitance and the other section of which is provided with a positive temperature coefficient of capacitance. Each of the sections is coupled in parallel with the capacitance cell of the fluid flow recording device, through separate fixed value capacitors having substantially zero temperature coefficient of capacitance. The choice of the section to be connected in parallel with the capacitance cell will and the electrical size of the zero temperature coefficient capacitance depend upon the particular type of crude oil being monitored by the capacitance cell.

It has been discovered that heavy crude oil has a positive temperature coefficient of dielectric constant while light oil has a negative temperature coefficient of dielectric constant. Thus it is impossible to use a single capacitor to correct for changes in the dielectric constant caused by temperature changes for all crude oil mixtures. This invention results from the discovery that the use of two separate capacitors, one having a negative and the other having a positive temperature coefficient in series with fixed value capacitors provides a means for correcting for temperature changes in both light and heavy crude oils. It is only necesssary to change the value of the fixed value capacitor for various oils which have the same type of temperature coefficient of dielectric constant to obtain the proper compensation. For crude oils having the opposite type of temperature coefficient the other section of the compensating capacitor and its associated fixed capacitor are used. Certain crude oils exhibit a non-linear dielectric constant vs. temperature characteristic. Ceramic materials (suitable for capacitor bodies) having temperature characteristics that will complement the temperature characteristics of such crude oils are known in the art. The invention described here is applicable for temperature compensation in the non-linear case by use of a suitable material in the compensating capacitor.

Figure 2:
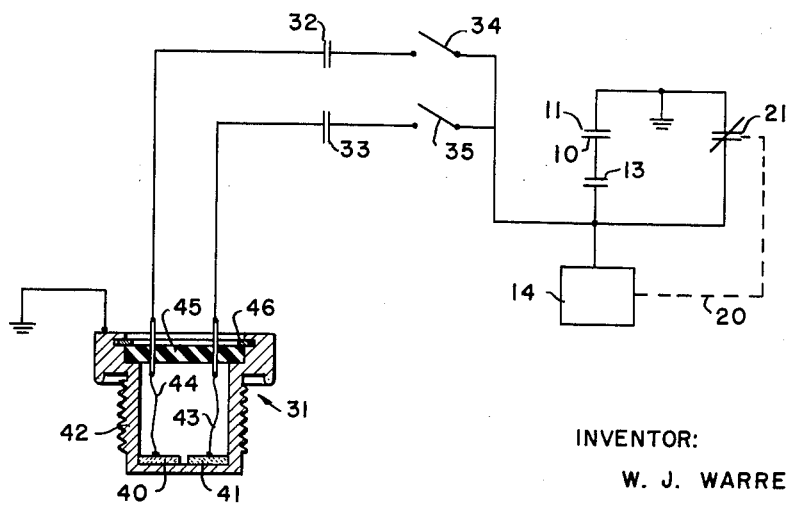

The above and other objects will be more easily understood from the following detailed description of a preferred embodiment when taken in conjunction with the attached drawings in which:

FIGURE 1 is a schematic drawing of a fluid flow recorder incorporating the temperature compensating means of this invention; and FIGURE 2 is a detailed drawing of the temperature compensating capacitor of this invention showing the two separate sections thereof.

Referring to FIGURE 1, there is shown a fluid flow recorder similar to that described in the above-referenced Warren et al. patent application which is incorporated herewith by reference. The capacitance cell of the fluid flow recorder is formed by central electrode 10 and the wall of the pipe 11. The central electrode 10 is insulated from the wall of the pipe and connected to the null-balancing amplifier discriminator circuit 14 by means of a lead 12. The null-balancing amplifier discriminator circuit 14 is preferably a phase comparison circuit that determines the phase difference between two resistance, inductance capacitance circuits, one of which includes the capacitance cell formed by the electrode 10 and pipe 11. A suitable null-balancing amplifier discriminator circuit is described in U.S. Patent 2,939,077 to F. H. Branin, Jr., entitled "Phase Discriminating System." A suitable capacitor 13 having a uniquely specifiable value is disposed in series with the central electrode 10 to obtain a substantially linear relationship between the resulting capacitance from point 4 to ground (due only to the capacitance cell and capacitor 13) and the percentage of water contained in the mixture. The output of the null-balancing amplifier discriminator circuit 14 is coupled to a servo motor 16 which drives a shaft 17 to position a variable capacitance 21 through a linkage 20. The variable capacitor 21 is disposed in parallel relation with the capacitance cell and capacitor 13 combination and effectively returning the R-L-C (resistance, inductance, capacitance) circuit including these elements to a null-balance with the other R-L-C circuit in the null-balancing amplifier phase discriminator 14.

The total flow through the pipe 11 is determined by a flow meter 22 which drives a shaft 23. The shaft 23 in turn drives a gross flow recorder 25 and one of the inputs to the ball-and-disc integrator 26. The other input (i.e. the ball carriage) to the ball-and-disc integrator 26 is positioned by the servo motor 16. The servo motor can also be connected to position the pen of a chart recorder 30 to record the percentage of water contained in the crude oil water mixture.

The temperature compensating capacitor 31 is disposed in the wall of the pipe 11 so that it will be responsive to changes in the temperature of the crude oil water mixture flowing in the pipe 11. The detailed structure of the temperature compensating capacitor 31 will be more fully described below. Sections 40 and 41 of the temperature compensating capacitor 31 are the active elements and are connected to fixed value capacitors 32 and 33, respectively. The fixed value capacitors 32 and 33 should both have a substantially zero temperature coefficient of capacitance. Two switches 34 and 35 are disposed in series with the capacitors 32 and 33 so that either one may be coupled in parallel with the measuring circuit null-balancing amplifier discriminator 14 by means of a lead 36.

When the above-described system is operated the flow meter 22 will determine the total flow through the pipeline 11 while the capitance cell and associated circuitry will determine the percent of water in the total flow. The capacitance cell and associated circuits will determine the percent of water in the total flow by determining the change in the dielectric constant of material flowing in the pipeline which will be related to the water contained in the crude oil. Any change in the dielectric constant of the flow will unbalance the measuring circuit which includes the compensating capacitor 31 and the variable capacitor 21. This unbalance will be detected by the null-balancing amplifier discriminator circuit 14 which in turn will energize the servo motor 16 to position the variable capacitor 21 to rebalance the circuit. The percentage of water in the flow in the pipeline 11 is used to convert the gross flow to clean oil flow by means of the ball-and-disc integrator 26 and the flow meter 22. If the temperature of the flow in the pipeline 11 changes it will be compensated for by the variable compensating capacitor 31 and one of the capacitors 32 or 33 which are coupled in series with the compensating capacitor. As explained above heavy crude oils have a positive temperature coefficient of capacitance and thus the section of the capacitor 31 having a negative temperature coefficient of capacitance should be coupled to the capacitor cell in order to correct for temperature changes when a heavy crude is flowing in the pipeline 11. In the case of light crudes which have a negative temperature coefficient capacitance the positive section of the temperature correcting capacitor 31 should be coupled to the capacitance cell. The particular values of the two sections of the compensating capacitor and the fixed value capacitors 32 and 33 will have to be determined by experiment as will be more fully explained below.

Referring now to FIGURE 2, the temperature compensating capacitor 31 consists of two semi-circular dielectric elements 40 and 41, preferably formed of ceramic type materials whose dielectric constant varies with temperature. One of the elements should have positive temperature coefficient while the other should have negative coefficient. Suitable materials for the elements 40 and 41 are described in the U.S. Bureau Standard of Journal Research, volume 38, pages 243-247, March 1947. Each of the elements 40 and 41 should have their flat surfaces silvered or similarly treated in order to form the spaced plates of the capacitors. The two elements are disposed in the bottom of a cup shaped tubular member 42 which is provided with threads on its outer surface so that it can be threaded into a pipeline 11. The element 40 is connected to the capacitor 32 by a lead 44 while the element 41 is connected to the capacitor 33 by a lead 43. The two leads pass through an insulating sealing member 45 which is held in place by an end cap 46. From the above description, it can be appreciated that each of the elements 40 and 41 form an individual capacitor. If the dielectric materials forming the elements 40 and 41 have opposite temperature coefficients it will permit one to choose the proper type of compensating capacitor to correct for the particular crude oil flowing in the pipeline 11. The remainder of the circuit shown in FIGURE 2 is the same as that shown in FIGURE 1 and described above. While the elements 40 and 41 are described as having a semi-circular shape, other shapes may also be used.

The following explains how the value of each section of the compensating capacitor 31 and each of the capacitors 32 and 33 may be determined. The dielectric constant of a crude oil can be described by $$\epsilon = \epsilon_0 + \alpha(T - T_0)$$

where $\epsilon_0$ is the dielectric constant at $T_0°$ F. (generally 60° F.), $\epsilon$ is the dielectric constant at $T°$ F., and $\alpha$ is the temperature coefficient of the dielectric constant and may be positive or negative.

The capacitance of a cell having active capacitance of $C_0$ mmf. (micromicrofarads) and stray capacitance of $C_c$ and field with a clean dry crude oil will be $$C_p = \epsilon C_0 + C_c = C_0(\epsilon_0 + \alpha(T - 60)) + C_c$$

$C_p$ will vary with temperature according to $$\Delta C_p = \alpha C_0 \Delta T$$

For practical applications the series capacitor $C_s$ (capacitor 13) is made very large compared to $C_p$. In fact, for those instances (viz., 0–10% B.S. and W. range) for which temperature effects will have significant influence on the accuracy of measurement $C_s$ is effectively shorted. Then the temperature variation of $C_p$ will be directly complemented by the action of the temperature compensator circuit branch.

The compensator capacitance 31 will have a total capacitance $$C_t = C_{t0}(1 + \beta(T - T_0)) + C_{tc}$$

Where $C_{tc}$ is the inactive capacitance of the compensator unit, $C_{t0}$ is the capacitance (at temperature $T_0$) of the active portion, and $\beta$ is the temperature coefficient of the latter.

$C_t$ has the capacitor $C_{ts}$ (viz., capacitor 32 or 33) in series with it. The total capacitance of the temperature compensation branch as presented to the measuring circuit is $$C_{t1} = \frac{C_t C_{ts}}{C_t + C_{ts}}$$

and for temperature compensation $$\Delta C_p + \Delta C_{t1} = 0$$

$$0 = \alpha C_0 \Delta T + \left[\frac{C_{ts}}{C_{ts} + C_{t0} + C_{tc}}\right]^2 C_{t0} \beta \Delta T$$

For a typical case for a light crude oil
$C_{t0} = 40$ mmf.
$C_{tc} = 20$ mmf.
$\beta = +2000$ p.p.m./° C. $= 0.2\%$/° C.
$\alpha = -.0005$/° C.

for which one obtains $C_{ts} = 45.8$ mmf.

From the above description it can be seen that by selecting proper ceramic materials for the individual sections of the compensating capacitor 31 having positive and negative temperature coefficients, respectively, one is able to correct for a large number of crude oils without changing the capacitance of the individual sections. This results from the fact that the term $C_{ts}$ appears in both the numerator and denominator of the above equation. Since this term represents the capacitance of the fixed value capacitor 32 or 33 it is a simple matter to adjust metering system for any particular crude oil by installing a capacitor having the proper value. It is, of course, easier to install a fixed value capacitor in the circuit than it is to change the capacitance or temperature coefficient of the compensating capacitor 31. This is particularly true when the system is installed in an oil field.

I claim as my invention:

1. An apparatus for correcting a water cut recording device of the capacitance cell type for temperature changes comprising: a first capacitor disposed in the flow stream being monitored by the water cut recorder, the capacity of said first capacitor varying with temperature; a second capacitor coupled in series with said first capacitor, the capacity of said second capacitor remaining substantially constant over the normal temperature range of the stream being monitored; and said first and second capacitors being coupled in parallel with the capacitance cell of the water cut recorder.

2. An apparatus for correcting a water cut recording device of the capacitance cell type for temperature changes comprising: a compensating capacitor disposed in the flow stream being monitored by the water cut recorder, said compensating capacitor having two separate sections, one of said separate sections decreasing in capacitance with increasing temperature the other of said sections increasing in capacitance with increasing temperature; first and second capacitors coupled in series with said separate sections of said compensating capacitor, said first and second capacitors having substantially constant capacitance over the temperature range of the flow stream being monitored by the water cut recorder and said separate sections of said compensating capacitor and said first and second capacitors being coupled in parallel with the capacitance cell of the water cut recorder.

References Cited in the file of this patent

UNITED STATES PATENTS

| | | |
|---|---|---|
| 2,438,935 | Marsh | Apr. 6, 1948 |
| 2,535,027 | Anderson | Dec. 26, 1950 |
| 2,607,828 | Razek | Aug. 19, 1952 |
| 2,617,299 | Ennis et al. | Nov. 11, 1952 |
| 2,674,049 | James | Apr. 6, 1954 |
| 2,718,619 | Whittier | Sept. 20, 1955 |
| 2,923,880 | Mayes | Feb. 2, 1960 |